United States Patent
Agnihotram et al.

(10) Patent No.: US 10,902,638 B2
(45) Date of Patent: Jan. 26, 2021

(54) METHOD AND SYSTEM FOR DETECTING POSE OF A SUBJECT IN REAL-TIME

(71) Applicant: WIPRO LIMITED, Bangalore (IN)

(72) Inventors: Gopichand Agnihotram, Bangalore (IN); Prashanth Kumar Ponnarassery, Kozhikode (IN); Pandurang Naik, Pune (IN)

(73) Assignee: Wipro Limited, Bangalore (IN)

( * ) Notice: Subject to any disclaimer, the term of this patent is extended or adjusted under 35 U.S.C. 154(b) by 147 days.

(21) Appl. No.: 16/196,012

(22) Filed: Nov. 20, 2018

(65) Prior Publication Data
US 2020/0105014 A1  Apr. 2, 2020

(30) Foreign Application Priority Data

Sep. 28, 2018  (IN) .............................. 201841036851

(51) Int. Cl.
*G06K 9/00* (2006.01)
*G06T 7/73* (2017.01)

(52) U.S. Cl.
CPC ...................................... *G06T 7/75* (2017.01)

(58) Field of Classification Search
None
See application file for complete search history.

(56) References Cited

U.S. PATENT DOCUMENTS

| | | | |
|---|---|---|---|
| 9,159,134 B2 | 10/2015 | Martinetz et al. | |
| 2009/0175540 A1 | 7/2009 | Dariush et al. | |
| 2009/0251462 A1* | 10/2009 | Kaytis | G06T 3/40 345/419 |
| 2010/0195867 A1* | 8/2010 | Kipman | G06K 9/00362 382/103 |
| 2010/0215271 A1 | 8/2010 | Dariush et al. | |
| 2011/0267344 A1 | 11/2011 | Germann et al. | |
| 2019/0073826 A1* | 3/2019 | Bailey | G06T 17/205 |
| 2019/0147292 A1* | 5/2019 | Watanabe | G06F 16/7837 382/103 |
| 2019/0180473 A1* | 6/2019 | Guleryuz | G06K 9/6255 |

OTHER PUBLICATIONS

Coskun, H., et al., "Human Pose Estimation with CNNs and LSTMs", TUM (2016), 70 pages.
Luo, Y. et al., LSTM Pose Machines, Computer Vision Foundation (2018), pp. 9 pages.

* cited by examiner

*Primary Examiner* — Sean M Conner
(74) *Attorney, Agent, or Firm* — Finnegan, Henderson, Farabow, Garrett & Dunner, LLP

(57) ABSTRACT

Disclosed herein is method and system for detecting pose of a subject in real-time. In an embodiment, nodal points corresponding to the subject may be identified and used for identifying skeleton pose of the subject. Thereafter, a feature descriptor for the skeleton pose may be computed based on the nodal points. Further, the feature descriptor of the skeleton pose may be compared with predetermined feature descriptors for detecting the pose of the subject as predefined pose corresponding to one of the predetermined feature descriptors used for the comparison. The method of present disclosure makes accurate pose detection from a two-dimensional image of the subject, using a pose detection model, which is pre-trained with predetermined feature descriptors and deep learning techniques.

8 Claims, 6 Drawing Sheets

US 10,902,638 B2

METHOD AND SYSTEM FOR DETECTING POSE OF A SUBJECT IN REAL-TIME

TECHNICAL FIELD

The present subject matter is, in general, related to pose detection and more particularly, but not exclusively, to a method and system for detecting pose of a subject in real-time.

BACKGROUND

Pose detection or pose estimation is a computer vision technique for detecting position and orientation of an object. Existing pose detection approaches make use of training-based models, which are trained using enormous amount of training data. However, in the existing approaches, process or generating the training models itself requires huge computational efforts and resources to train the models on all possible poses of living and non-living objects. Moreover, the existing approaches require high frame rate inputs and preceding sequence of frames as well for predicting the poses. However, if the frame rate is less, or if the preceding frames are unavailable, then the existing approaches may fail to predict the poses accurately and efficiently.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for detecting pose of a subject in real-time. The method comprises identifying, by a pose detection system, a plurality of nodal points corresponding to the subject from an input image frame of the subject. Further, the method comprises identifying a skeleton pose of the subject based on the plurality of nodal points. Thereafter, the method comprises computing a feature descriptor for the skeleton pose based on the plurality of nodal points. Upon computing the feature descriptor, the method comprises comparing the feature descriptor of the skeleton pose with a plurality of predetermined feature descriptors using a pose detection model. The pose detection model is pre-trained with each of the plurality of predetermined feature descriptors, corresponding to a predefined pose of the subject, using predetermined deep learning techniques. Each of the plurality of predetermined feature descriptors are computed based on skeleton key points obtained by rotating a plurality of nodal points, corresponding to a reference image frame of the subject, in a three-dimensional vector space. Finally, the method comprises detecting the pose of the subject as the predefined pose corresponding to one of the plurality of predetermined feature descriptors based on the comparison.

Further, the present disclosure relates to a pose detection system for detecting pose of a subject in real-time. The pose detection system comprises a processor and a memory. The memory is communicatively coupled to the processor and stores processor-executable instructions, which on execution, cause the processor to identify a plurality of nodal points corresponding to the subject from an input image frame of the subject. Further, the instructions cause the processor to identify a skeleton pose of the subject based on the plurality of nodal points. Thereafter, the instructions cause the processor to compute a feature descriptor for the skeleton pose based on the plurality of nodal points. Upon computation of the feature descriptor, the instructions cause the processor to compare the feature descriptor of the skeleton pose with a plurality of predetermined feature descriptors using a pose detection model. The pose detection model is pre-trained with each of the plurality of predetermined feature descriptors, corresponding to a predefined pose of the subject, using predetermined deep learning techniques. Each of the plurality of predetermined feature descriptors are computed based on skeleton key points obtained by rotating a plurality of nodal points, corresponding to a reference image frame of the subject, in a three-dimensional vector space. Finally, the instructions cause the processor to detect the pose of the subject as the predefined pose corresponding to one of the plurality of predetermined feature descriptors based on the comparison.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
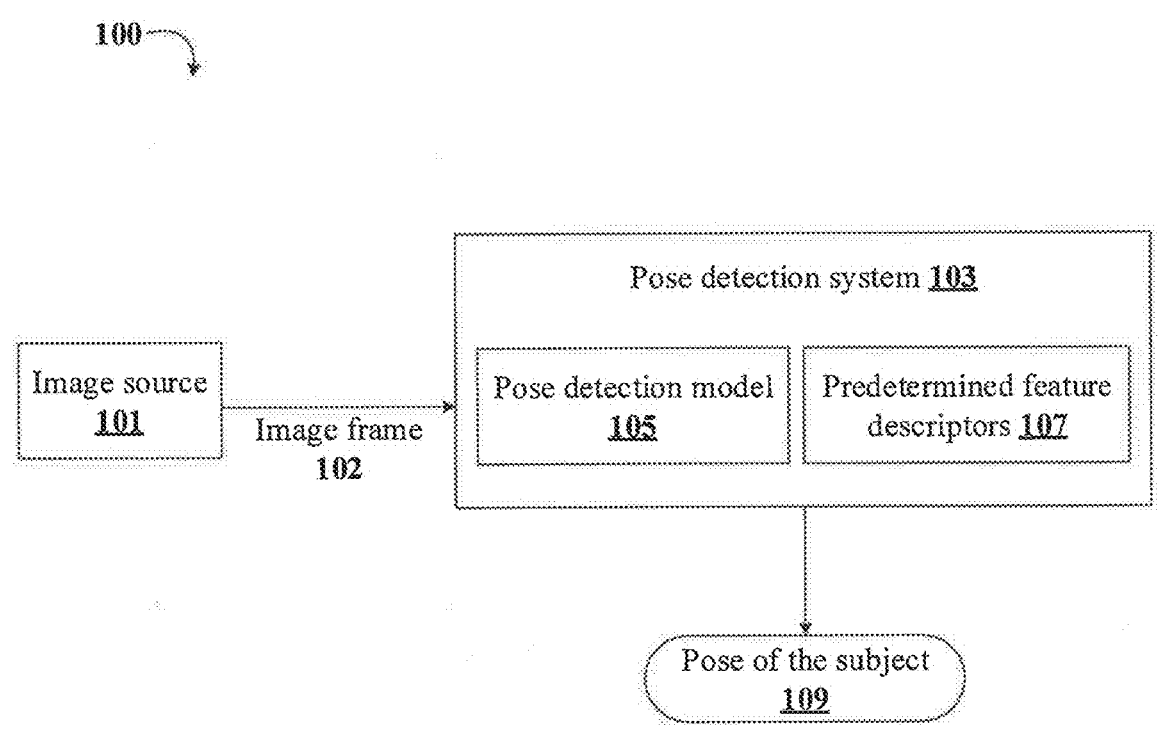
FIG. 1 illustrates an exemplary environment for detecting pose of a subject in real-time in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such, computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a pose detection system for detecting pose of a subject in real-time. The method of present disclosure uses nodal points of the subject to compute a feature descriptor corresponding to a pose of the subject. In an embodiment, the method includes generating the nodal points for different orientations of the subject to compute the feature descriptors corresponding to each possible pose of the subject. The feature vectors are computed based on distance between each nodal point. In a similar way, pose information for each pose such as standing, sitting, hands-up, hands-down and the like is generated and trained using a feed forward technique to generate a training model. Subsequently, the trained model is used to detect the pose of the subject in real-time with an input image frame or a live video streaming data.

In an embodiment, the method of present disclosure may be classified into three phases as illustrated below:
1. Generation Phase: In this phase, all the nodal points are identified for an input image frame. Further, one or more feature vectors are computed corresponding to each pose of the subject using the identified nodal points.
2. Training Phase: In this phase, a feed forward network or a pose detection classifier model is trained using each of the one or more feature vectors computed in the generation phase.
3. Detection Phase: In this phase, the pose of a human or the pose of any other living being/non-living things may be detected using the trained pose detection classified model with real-time video streaming data and/or an input image frame.

In an embodiment, the method of present disclosure may be deployed as a framework/application to capture different poses of a human, such as an interviewee, for effective communication. Also, unlike existing approaches of pose detection, the proposed method may use two-dimensional image frames of the subject for accurate estimation of the pose with less computation.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment 100 for detecting pose of a subject in real-time in accordance with some embodiments of the present disclosure.

In some implementations, the pose detection system 103 may be a desktop computer, a laptop, a smartphone or any similar electronic device, which may be configured to receive an image frame 102 of the subject in real-time and detect pose of the subject 109 in real-time. As an example, the subject may be a non-living thing such as furniture, or a living-being such as human beings and animals. In an embodiment, the image frame 102 of the subject may be received from an image source 101 associated with the pose detection system 103. For example, the image source 101 may include, without limiting to, image/video capturing devices such as digital camera, web camera, security/surveillance camera and the like. In an embodiment, the image source 101 may be connected to the pose detection system 103 over a wired and/or a wireless communication network (not shown in FIG. 1) for transmitting the image frame 102 to the pose detection system 103.

In some embodiments, the image frame 102 may be a two-dimensional image of the subject. In other embodiments, the image frame 102 may be a three-dimensional image of the subject, captured using specialized image capturing devices such as a depth camera. In alternative embodiments, the image frame 102 may be extracted from a live video streaming of the subject, received from a video capturing device associated with the pose detection system 103.

In an embodiment, upon receiving the image frame 102, the pose detection system 103 may identify a plurality of nodal points corresponding to the subject from the input image frame 102 of the subject. In an embodiment, the nodal points may be predetermined points or nodes corresponding to the subject, which is derived from the image frame 102 of the subject. Each subject, either a non-living thing or a living being may be associated with a predetermined set of nodal points.

In an embodiment, after identifying the nodal points of the subject, the pose detection system 103 may identify a skeleton pose of the subject 109 based on the plurality of nodal points identified. As an example, the skeleton pose of the subject 109 may be identified by joining the plurality of nodal points based on one or more nodal arrangements retrieved from predefined node detection libraries. Thus, the skeleton pose of the subject 109 may be obtained by arranging the nodal points in a specific nodal arrangement as specified in the predefined node detection libraries. As an example, the predefined node detection libraries may include, without limiting to, DeepCut, OpenPose, OpenCV and the like.

In an embodiment, upon identifying the skeleton pose, the pose detection system 103 may compute a feature descriptor for the skeleton pose based on the plurality of nodal points. In some implementations, the pose detection system 103 may compute the feature descriptor for the skeleton pose by identifying a subset of the plurality of nodal points based on spatial difference between each of the plurality of nodal points. Once the subset of nodal points is identified, a feature vector corresponding to each pair of the plurality of nodal points in the subset of the plurality of nodal points may be generated. Thereafter, values of distance between each of the feature vectors may be computed and ordered in a predefined sequence for computing the feature descriptor. As an example, the predefined sequence may be at least one of, without limiting to, an increasing sequence of values or a decreasing sequence of values.

In an embodiment, after computing the feature descriptor for the skeleton pose, the pose detection system 103 may compare the feature descriptor of the skeleton pose with a plurality of predetermined feature descriptors 107 using a pose detection model 105. In some implementations, the pose detection model 105 may be obtained by training the model with each of the plurality of predetermined feature descriptors 107, corresponding to a predefined pose of the subject 109, using predetermined deep learning techniques. As an example, the predetermined deep learning techniques may include, without limiting to, a feed-forward network, Convolutional Neural Network (CNN) technique or Support Vector Machine (SVM) learning technique. In an embodiment, each of the plurality of predetermined feature descriptors 107 may be computed based on skeleton key points obtained by rotating a plurality of nodal points, corresponding to a reference image frame 102 of the subject, in a three-dimensional vector space. In some implementations, rotation of the plurality of nodal points may be performed along a predetermined angle with respect to the reference image frame 102 of the subject.

In an embodiment, upon comparing the feature descriptor of the skeleton structure with the plurality of predetermined feature descriptors 107, the pose detection system 103 may detect the pose of the subject 109 as the predefined pose corresponding to one of the plurality of predetermined feature descriptors 107. That is, the pose detection system 103 may assign a similarity score for each of the plurality of predetermined feature descriptors 107 based on comparison of the feature descriptor of the skeleton pose with the plurality of predetermined feature descriptors 107. Subsequently, the predefined pose corresponding to one of the predetermined feature descriptors 107, having highest similarity score may be selected as the pose of the subject 109. Thus, the pose detection system 103 uses the pre-trained pose detection model 105 and the feature descriptor of the skeleton pose of the subject 109 to dynamically detect the pose of the subject 109.

Figure 2:
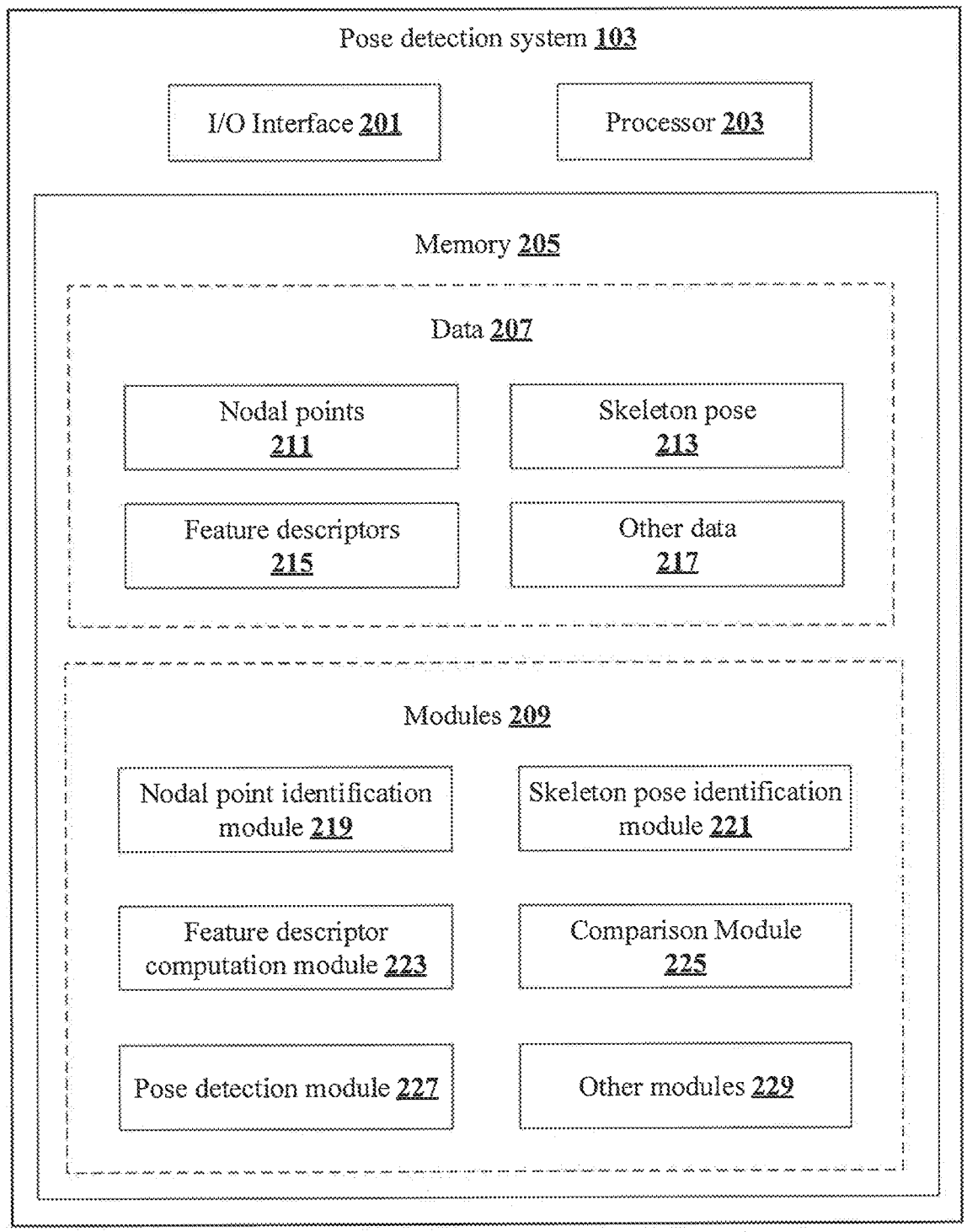
FIG. 2 shows a detailed block diagram illustrating a pose detection system in accordance with some embodiments of the present disclosure.

FIG. 2 shows a detailed block diagram illustrating a pose detection system 103 in accordance with some embodiments of the present disclosure.

In some implementations, the pose detection system 103 may include an I/O interface 201, a processor 203, and a memory 205. The I/O interface 201 may be configured to receive an image frame 102 of a subject from an image source 101 associated with the pose detection system 103. The memory 205 may be communicatively coupled to the processor 203 and may store data 207 and one or more modules 209. The processor 203 may be configured to perform one or more functions of the pose detection system 103 for detecting the pose of the subject in real-time using the data 207 and the one or more modules 209.

In an embodiment, the data 207 may include, without limitation, information related to nodal points 211, skeleton pose 213, feature descriptors 215 and other data 217. In some implementations, the data 207 may be stored within the memory 205 in the form of various data structures. Additionally, the data 207 may be organized using data models, such as relational or hierarchical data models. The other data 217 may store various temporary data and files generated by one or more modules 209 while performing various functions of the pose detection system 103. As an example, the other data 217 may also include information related to predetermined feature descriptors 107 used for training the post detection model.

In an embodiment, the nodal points 211 correspond to the predetermined nodes or reference points on the image frame 102 of the subject. Each subject may be associated with a set of nodal points 211 which are predefined for each type of the subject. Further, each of the nodal points 211 may be allowed to move across the nodal arrangement with respect to each of the other nodal points 211 in the set of predetermined nodal points 211. As a result, the nodal arrangement among each of the nodal points 211 may vary in response to the pose of the subject.

In an embodiment, the skeleton pose 213 of the subject may be obtained by joining the plurality of nodal points 211 based on one or more nodal arrangements retrieved from predefined node detection libraries. As an example, the predefined node detection libraries may include, without limiting to, DeepCut, OpenPose, OpenCV and the like. In an embodiment, the one or more nodal arrangements retrieved from the predefined node detection libraries may be specific to each type of subject. For example, when the subject is a human being, a nodal arrangement specific to human beings may be retrieved from the predefined library. Subsequently, each of the nodal points 211 may be joined with reference to the nodal arrangement specific to human beings to obtain a skeleton pose 213 corresponding to human beings.

In an embodiment, the feature descriptors 215 for the skeleton pose 213 of the subject may be computed based on a spatial relationship and/or spatial similarity measure between each possible pairs of the nodal points 211 that form the skeleton pose 213. During training of the pose detection model 105, feature descriptors 215 may be computed for each possible pose of the subject and stored in the memory 205 of the pose detection system 103 as the predetermined feature descriptors 107. In an embodiment, the feature descriptors 215 of all the generated poses may be stored along with corresponding pose labels for enhancing accuracy of pose detection. Subsequently, the feature descriptors 215 of all the generated poses and the corresponding labels may be used for generating and training the pose detection model 105.

In an embodiment, each of the data 207 may be processed by the one or more modules 209. In some implementations, the one or more modules 209 may be communicatively coupled to the processor 203 for performing one or more functions of the pose detection system 103. In an implementation, the one or more modules 209 may include, without limiting to, a nodal point identification module 219, a skeleton pose identification module 221, a feature descriptor computation module 223, a comparison module 225, a pose detection module 227 and other modules 229.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 229 may be used to perform various miscellaneous functionalities of the pose detection system 103. It will be appreciated that such one or more modules 209 may be represented as a single module or a combination of different modules.

In an embodiment, the nodal point identification module 219 may be configured for identifying the plurality of nodal points 211 corresponding to the subject from the input image frame 102 of the subject. The nodal point identification module 219 may be integrated with predefined external libraries such as, without limiting to, OpenPose, DeepCut, and the like, which help in extracting nodal points 211 of the subject. As an example, the nodal point identification module 219 may be configured to identify nodal points 211 of any living being or non-living subject such as, a rotating wheel, orientation of a wind wheel, a railway signal, animals and the like, with the help of nodal point recognition techniques embedded in the predefined libraries.

In an embodiment, the skeleton pose identification module 221 may be configured for identifying the skeleton pose 213 of the subject based on the plurality of nodal points 211. The skeleton pose 213 may be identified by joining the plurality of nodal points 211 based on the one or more nodal arrangements retrieved from the predefined node detection libraries. In an embodiment, the skeleton pose identification module 221 may define the skeleton pose 213 when the plurality of nodal points 211, constituting a pose, appear in a particular arrangement on a two-dimensional image plane. Further, a spatial tolerance factor may be associated with each of the plurality of nodal points 211, to account for movement of the subject with reference to the two-dimensional image plane, such that the same pose label may be maintained throughout the pose detection process.

In an embodiment, the skeleton pose identification module 221 may be integrated with a rendering platform such as, without limiting to, an OpenGL-based rendering platform, where the nodal points 211 may be loaded and transformed into a three-dimensional plane to recreate the skeleton pose 213 of the subject. Here, the transformation of nodal points 211 may be achieved by multiplying the nodal points 211 with an appropriate transformation matrix within the rendering platform. Further, projections of the transformed nodal points 211 along 'x' and 'y' coordinates may be used for computation of the feature descriptor corresponding to the skeleton pose 213.

In an embodiment, the feature descriptor computation module 223 may be configured for computing the feature descriptor for the skeleton pose 213 based on the plurality of nodal points 211. For instance, the feature descriptor computation module 223 may compute the feature descriptors 215 based on a spatial similarity measure identified for each pair of the nodal points 211. Determining the spatial similarity measure may include formation of feature vectors, which are defined by connecting each pair of the nodal points 211. Further, a subset of plurality of feature vectors, which is sufficient enough to represent the skeleton pose 213 may be formed. Subsequently, the feature descriptor computation module 223 may compute values of spatial distance between each of the feature vectors and order the distance values in a predefined sequence for computing the feature descriptor for the skeleton pose 213.

In an embodiment, the comparison module 225 may be configured to compare the feature descriptor of the skeleton pose 213 with the plurality of predetermined feature descriptors 107 using the pose detection model 105. Upon comparison, the comparison module 225 may assign a similarity score for each of the plurality of predetermined feature descriptors 107 based on the comparison. The similarity score may be a probabilistic value between 0 and 1.

In an embodiment, the pose detection module 227 may be configured for detecting the pose of the subject based on the comparison. As an example, the pose detection module 227 may select the predefined pose corresponding to one of the plurality of predetermined feature descriptors 107 having highest similarity score as the pose of the subject. For example, suppose the pose detection model 105 is trained with the predetermined feature descriptors 107 corresponding to 'standing', 'sitting', and 'hands-up' poses of a human being as illustrated in equation 1, 2 and 3 below:

$$\text{Standing pose: } f(x,\alpha) = \alpha_1 x_1 + \alpha_2 x_2 + \ldots + \alpha_n x_n \quad (1)$$

$$\text{Sitting pose: } g(y,\beta) = \beta_1 y_1 + \beta_2 y_2 + \ldots + \beta_n y_n \quad (2)$$

$$\text{Hands-up: } h(z,\mu) = \mu_1 z_1 + \mu_2 z_2 + \ldots + \mu_n y_n \quad (3)$$

Further, the similarity score for a feature descriptor corresponding to the skeleton pose 213 may be obtained by using the trained pose detection model 105 based on comparison of the feature descriptor of the skeleton pose 213 with each of the predetermined feature descriptors 107 illustrated above. Suppose, the similarity score for feature descriptor with respect to the predetermined feature descriptor of the above three poses are obtained as $P_1$, $P_2$, and $P_3$, such that values of P1>P3>P2. That is, suppose similarity score for the feature descriptor of the skeleton pose 213 is highest with respect to the predetermined feature descriptor 'P1'. In such instance, the pose corresponding to the predetermined feature descriptor 'P1', i.e. the 'standing' pose of the subject, may be detected as the pose of the subject.

Figure 3A:
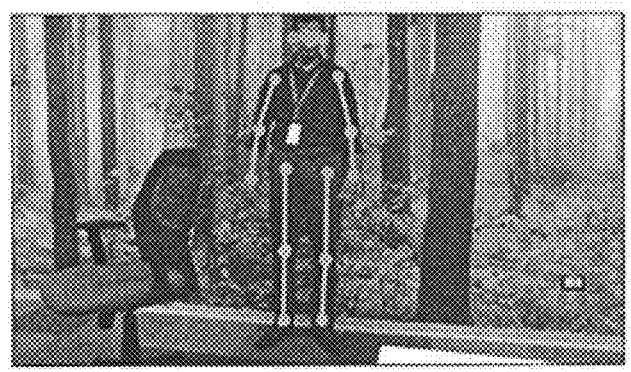
FIGS. 3A-3E show exemplary illustrations of detecting pose of a subject in accordance with some embodiments of the present disclosure.
Figure 3B:
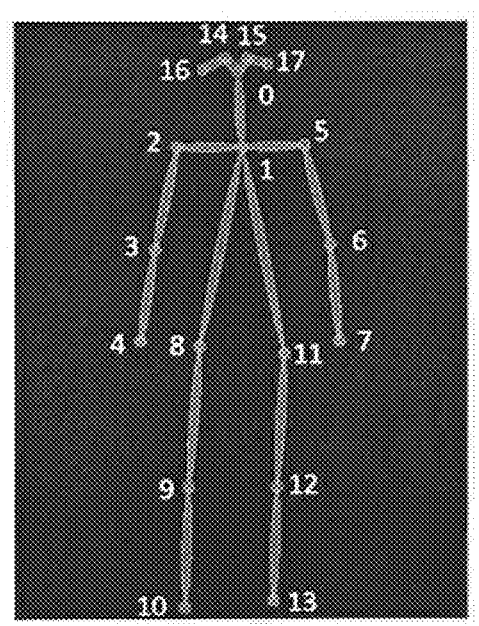

Exemplary Scenario:

Consider an exemplary scenario, wherein an image frame 102, indicating a person in the 'standing' pose is received by the pose detection system 103 for detecting the pose of the person. In an embodiment, upon obtaining the image frame 102, the pose detection system 103 may identify the plurality of nodal points 211 for corresponding to the person as shown in the FIG. 3A. Thereafter, the pose detection system 103 may establish appropriate connections between the nodal points 211 based on one or more reference nodal arrangements, corresponding to different poses of a human, retrieved from the predefined node detection libraries. The connections between the nodal points 211 define a skeleton pose 213 of the person as shown in FIG. 3B. Here, each nodal point of the person may be represented in a two-dimensional plane along having 'x' and 'y' co-ordinates. Also, each of the nodal points 211 may be numbered in a predetermined sequence to facilitate computation of feature descriptors 215 for the skeleton pose 213.

Figure 3C:
Figure 3D:
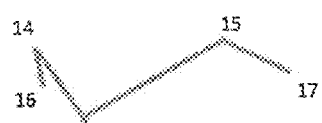
Figure 3E:

In an embodiment, the feature descriptor for the skeleton pose 213 in FIG. 3B may be computed based on spatial similarity between each possible pair of the nodal points 211. That is, the pose detection system 103 may identify a subset of the plurality of nodal points 211 based on spatial difference between each of the plurality of nodal points 211 and then generate a feature vector corresponding to each pair of the plurality of nodal points 211. Subsequently, distance values between each of the feature vectors may be computed and ordered in the predefined sequence to compute the feature descriptor for the skeleton pose 213. Computing the feature vector may also involve formation of a suitable number of feature vector subsets, which are suitable enough to represent the 'standing' pose of the person. For example, for the skeleton pose 213 of FIG. 3B, to detect the detection of head-front, head-left, and head-right position of the person, only the nodal points 211 "2", "1", "5", "0", "14", "15", "16", and "17" may be sufficient enough, as indicated in FIG. 3C, FIG. 3D and FIG. 3E.

In an embodiment, the spatial similarity among the nodal points 211 may be determined using predetermined distance estimation techniques such as cosine distance measure or Euclidean distance measure. For example, in case of the cosine similarity measure, the cosine-distance between all the possible vector pairs may be determined. Suppose, if 'A' and 'B' are the feature vectors corresponding to the skeleton pose 213, then the cosine-distance between the vectors may be defined as illustrated in equation (4) and equation (5) below:

$$Dc(A,B)=1-Sc(A,B) \quad (4)$$

Wherein, 'Dc' is the cosine distance and 'Sc' is the cosine similarity.

$$\text{Cosine similarity} = \cos(\Theta) \quad (5)$$
$$= A,B/\|A\|\|B\|$$
$$= \sum_{i=0}^{n} AiBi \Big/ \sqrt{\left(\sum_{i=0}^{n} Ai2\right)} \sqrt{\left(\sum_{i=0}^{n} Bi2\right)}$$

Further, the cosine distance values calculated as illustrated in equation (4) and (5) may be placed in a predefined sequence to form the feature descriptor. Thus, if there are "n" number of vectors, there will be "$n^2$" number of cosine distances values in the feature descriptors 215. In an embodiment, this may be set to any predefined sequence for placing the cosine distance values in the feature descriptor. Subsequently, the computed feature descriptor may be compared with the predetermined feature descriptors 107 used for training the pose detection model 105 for detecting the pose of the person in the image frame 102.

Figure 4:
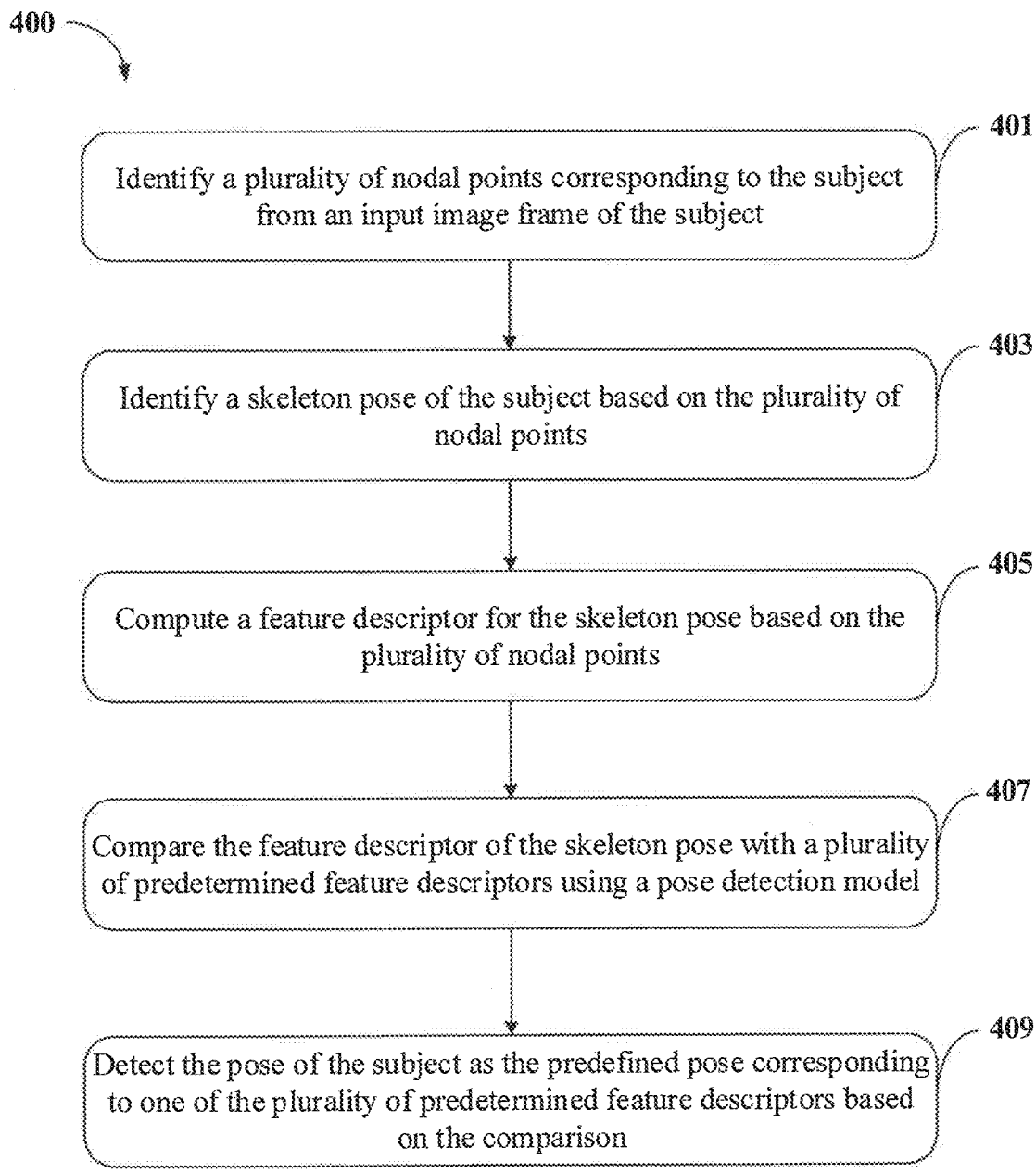
FIG. 4 shows a flowchart illustrating a method of detecting pose of a subject in real-time in accordance with some embodiments of the present disclosure.

FIG. 4 shows a flowchart illustrating a method of detecting pose of a subject in real-time in accordance with some embodiments of the present disclosure.

As illustrated in FIG. 4, the method 400 may include one or more blocks illustrating a method of detecting pose of a subject in real-time using the pose detection system 103 illustrated in FIG. 1. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method 400 includes identifying, by the pose detection system 103, a plurality of nodal points 211 corresponding to the subject from an input image frame 102 of the subject. In an implementation, the plurality of nodal points 211 corresponding to the subject may be identified by analysing the input image frame 102 using predetermined techniques.

At block 403, the method 400 includes identifying, by the pose detection system 103, a skeleton pose 213 of the subject based on the plurality of nodal points 211. In an embodiment, the skeleton pose 213 of the subject may be identified by joining the plurality of nodal points 211 based on one or more nodal arrangements retrieved from predefined node detection libraries.

At block 405, the method 400 includes computing, by the pose detection system 103, a feature descriptor for the skeleton pose 213 based on the plurality of nodal points 211. In an embodiment, computing the feature descriptor for the skeleton pose 213 may include identifying a subset of the plurality of nodal points 211 based on spatial difference between each of the plurality of nodal points 211. Upon identifying the subset of plurality of nodal points 211, a feature vector corresponding to each pair of the plurality of nodal points 211 in the subset of the plurality of nodal points 211 may be generated. Thereafter, distance values may be computed between each of the feature vectors. Subsequently, the distance values may be ordered in a predefined sequence for computing the feature descriptor.

At block 407, the method 400 includes comparing, by the pose detection system 103, the feature descriptor of the skeleton pose 213 with a plurality of predetermined feature descriptors 107 using a pose detection model 105. In an embodiment, the pose detection model 105 may be pre-trained with each of the plurality of predetermined feature descriptors 107, corresponding to a predefined pose of the subject, using predetermined deep learning techniques. Further, each of the plurality of predetermined feature descriptors 107 may be computed based on skeleton key points obtained by rotating a plurality of nodal points 211, corresponding to a reference image frame 102 of the subject, in a three-dimensional vector space. In an embodiment, rotating the plurality of nodal points 211 comprises rotating the plurality of nodal points 211 along a predetermined angle with respect to the reference image frame 102 of the subject.

At block 409, the method 400 includes detecting, by the pose detection system 103, the pose of the subject as the predefined pose corresponding to one of the plurality of predetermined feature descriptors 107 based on the comparison. In an embodiment, detecting the pose of the subject may include assigning a similarity score for each of the plurality of predetermined feature descriptors 107 based on comparison. Upon assigning the similarity score, the predefined pose corresponding to one of a predetermined feature descriptor, among the plurality of predetermined feature descriptors 107, having highest similarity score may be detected as the pose of the subject.

Computer System

Figure 5:
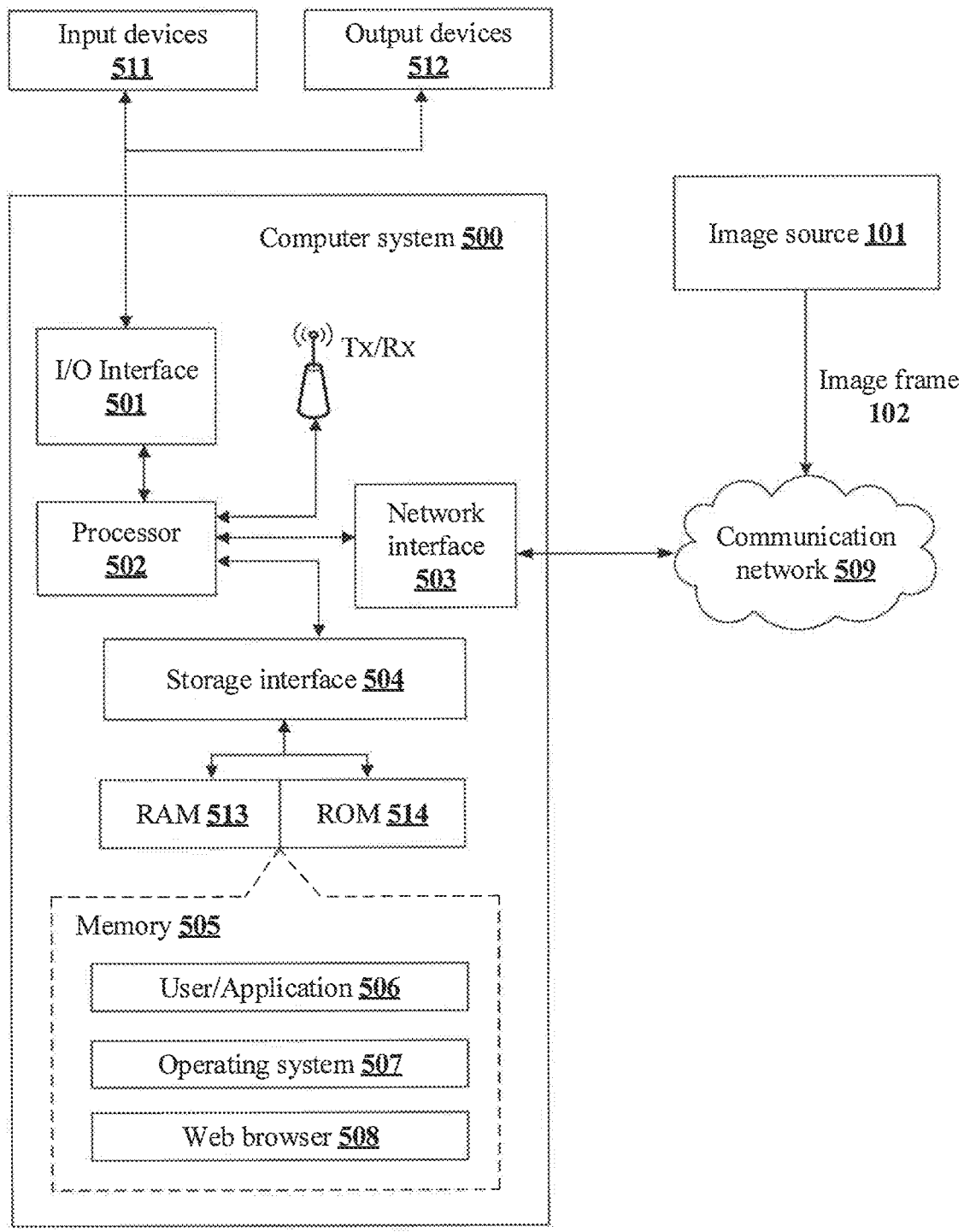
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be the pose detection system 103 illustrated in FIG. 1, which may be used for detecting pose of a subject in real-time. The computer system 500 may include a central processing unit ("CPU" or "processor") 502. The processor 502 may comprise at least one data processor for executing program components for executing user- or system-generated business processes. A user may include a person, a user in the environment 100, or any system/sub-system being operated parallelly to the computer system 500. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE®-1394, serial bus. Universal Serial Bus (USB), infrared, PS/2. BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 503 and the communication network 509, the computer system 500 may receive an image frame 102 from an image source 101 associated with the pose detection system 103. As an example, the image source 101 may include, without limiting to, image/video capturing devices such as digital camera, web camera, security/surveillance camera and the like.

In an implementation, the communication network 509 may be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browsers 508 may utilize facilities such as AJAX, DHTML, ADOBE® FLASH®, JAVASCRIPT®, JAVA®, Application Programming interfaces (APIs), and the like. Further, the computer system 500 may implement a mail server stored program component. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiments of the Present Disclosure are Illustrated Herein.

In an embodiment, the method of present disclosure helps in detecting pose of the subject in real-time.

In an embodiment, the method of present disclosure may be used to detect pose of the subject from a two-dimensional image of the subject, thereby eliminating requirement of using expensive depth cameras for capturing three-dimensional images of the subject.

In an embodiment, the method of present disclosure may be used for detecting pose of the subject from a low frame rate video content of the subject, thereby reducing processing time and computational efforts required for detecting the pose.

In an embodiment, the present disclosure discloses a faster and less complex method for training a pose detection model without using Graphics Processing Units (GPUs).

In an embodiment, the method of present disclosure integrates deep learning capabilities to a pre-trained pose detection model, trained for detecting pose of the subject, thereby enhancing accuracy of pose detection.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Image source |
| 102 | Image frame |
| 103 | Pose detection system |
| 105 | Pose detection model |
| 107 | Predetermined feature descriptors |
| 109 | Pose of the subject |
| 201 | I/O interface |
| 203 | Processor |
| 205 | Memory |
| 207 | Data |
| 209 | Modules |
| 211 | Nodal points |
| 213 | Skeleton pose |
| 215 | Feature descriptors |
| 217 | Other data |
| 219 | Nodal point identification module |
| 221 | Skeleton pose identification module |
| 223 | Feature descriptor computation module |
| 225 | Comparison module |
| 227 | Pose detection module |
| 229 | Other modules |
| 500 | Exemplary computer system |
| 501 | I/O Interface of the exemplary computer system |
| 502 | Processor of the exemplary computer system |
| 503 | Network interface |
| 504 | Storage interface |
| 505 | Memory of the exemplary computer system |
| 506 | User/Application |
| 507 | Operating system |
| 508 | Web browser |
| 509 | Communication network |
| 511 | Input devices |
| 512 | Output devices |
| 513 | RAM |
| 514 | ROM |

We claim:

1. Method for detecting pose of a subject in real-time, the method comprising:

identifying, by a pose detection system, a plurality of nodal points corresponding to the subject from an input image frame of the subject;

identifying, by the pose detection system, a skeleton pose of the subject based on the plurality of nodal points;

computing, by the pose detection system, a feature descriptor for the skeleton pose based on the plurality of nodal points wherein computing the feature descriptor for the skeleton pose comprises:

identifying a subset of the plurality of nodal points based on spatial difference between each of the plurality of nodal points;

generating a feature vector corresponding to each pair of the plurality of nodal points in the subset of the plurality of nodal points;

computing distance values between each of the feature vectors; and ordering the distance values in a predefined sequence for computing the feature descriptor;

comparing, by the pose detection system, the feature descriptor of the skeleton pose with a plurality of predetermined feature descriptors using a pose detection model, wherein the pose detection model is pre-trained with each of the plurality of predetermined feature descriptors, corresponding to a predefined pose of the subject, using predetermined deep learning techniques, wherein each of the plurality of predetermined feature descriptors are computed based on skeleton key points obtained by rotating the plurality of nodal points, corresponding to a reference image frame of the subject, in a three-dimensional vector space; and detecting, by the pose detection system, the pose of the subject as the predefined pose corresponding to one of the plurality of predetermined feature descriptors based on the comparison.

2. The method as claimed in claim 1, wherein the skeleton pose of the subject is identified by joining the plurality of nodal points based on one or more nodal arrangements retrieved from predefined node detection libraries.

3. The method as claimed in claim 1, wherein rotating the plurality of nodal points comprises rotating the plurality of nodal points along a predetermined angle with respect to the reference image frame of the subject.

4. The method as claimed in claim 1, wherein detecting the pose of the subject comprises:
   assigning a similarity score for each of the plurality of predetermined feature descriptors based on the comparison; and
   detecting the predefined pose corresponding to one of a predetermined feature descriptor, among the plurality of predetermined feature descriptors, having highest similarity score as the pose of the subject.

5. A pose detection system for detecting pose of a subject in real-time, the pose detection system comprising:
   a processor; and
   a memory, communicatively coupled to the processor, wherein the memory stores processor-executable instructions, which on execution, cause the processor to:
   identify a plurality of nodal points corresponding to the subject from an input image frame of the subject;
   identify a skeleton pose of the subject based on the plurality of nodal points;
   compute a feature descriptor for the skeleton pose based on the plurality of nodal points, wherein computing the feature descriptor for the skeleton pose comprises:
      identifying a subset of the plurality of nodal points based on spatial difference between each of the plurality of nodal points;
      generating a feature vector corresponding to each pair of the plurality of nodal points in the subset of the plurality of nodal points;
      computing distance values between each of the feature vectors; and
      ordering the distance values in a predefined sequence for computing the feature descriptor;
   compare the feature descriptor of the skeleton pose with a plurality of predetermined feature descriptors using a pose detection model,
   wherein the pose detection model is pre-trained with each of the plurality of predetermined feature descriptors, corresponding to a predefined pose of the subject, using predetermined deep learning techniques,
   wherein each of the plurality of predetermined feature descriptors are computed based on skeleton key points obtained by rotating the plurality of nodal points, corresponding to a reference image frame of the subject, in a three-dimensional vector space; and
   detect the pose of the subject as the predefined pose corresponding to one of the plurality of predetermined feature descriptors based on the comparison.

6. The pose detection system as claimed in claim 5, wherein the processor identifies the skeleton pose of the subject by joining the plurality of nodal points based on one or more nodal arrangements retrieved from predefined node detection libraries.

7. The pose detection system as claimed in claim 5, wherein the instructions cause the processor to rotate the plurality of nodal points along a predetermined angle with respect to the reference image frame of the subject.

8. The pose detection system as claimed in claim 6, wherein to detect the pose of the subject, the processor is configured to:
   assign a similarity score for each of the plurality of predetermined feature descriptors based on the comparison; and
   detect the predefined pose corresponding to one of a predetermined feature descriptor, among the plurality of predetermined feature descriptors, having highest similarity score as the pose of the subject.

* * * * *